Dec. 12, 1933.   M. V. ANDREWS   1,938,735
ROTARY ENGINE
Filed Oct. 27, 1931   3 Sheets-Sheet 1

Inventor
Moriel V. Andrews
By Albert E. Dieterich
Attorney.

Dec. 12, 1933. M. V. ANDREWS 1,938,735
ROTARY ENGINE
Filed Oct. 27, 1931 3 Sheets-Sheet 2
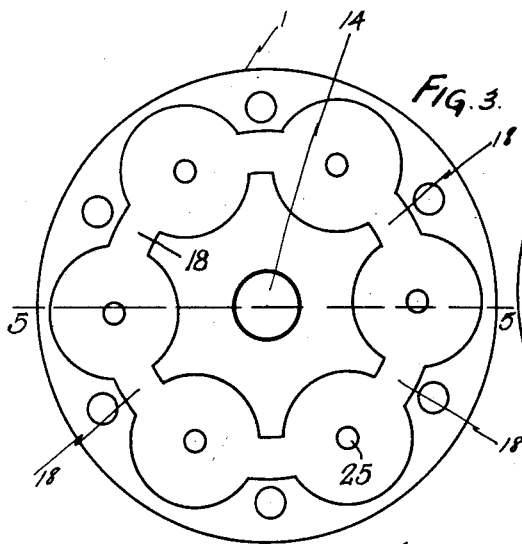
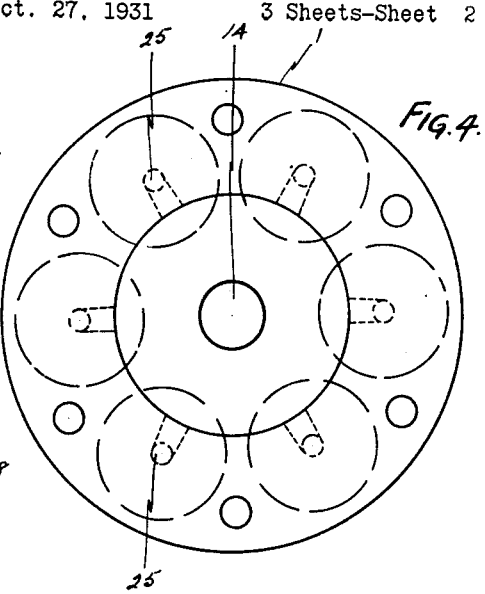
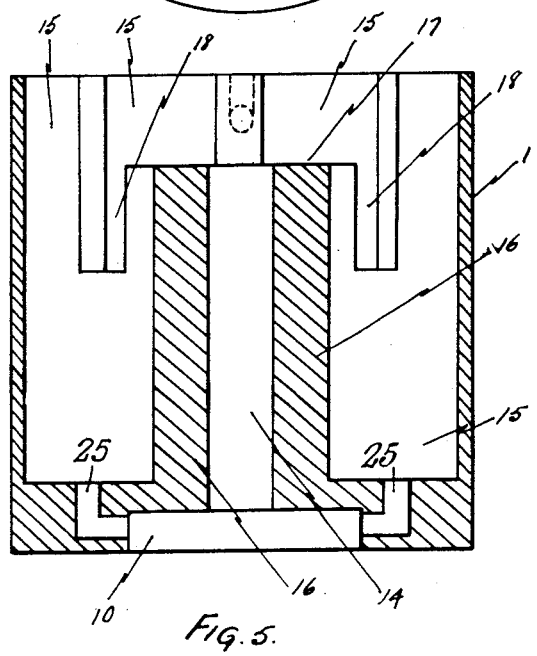
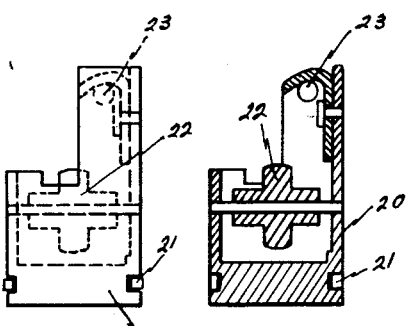
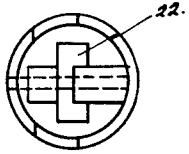
Inventor
Moriel V. Andrews
By Albert E Dieterich
Attorney.

Dec. 12, 1933.   M. V. ANDREWS   1,938,735
ROTARY ENGINE
Filed Oct. 27, 1931   3 Sheets-Sheet 3
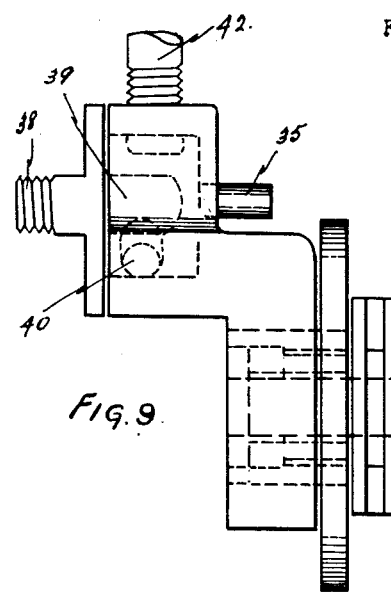
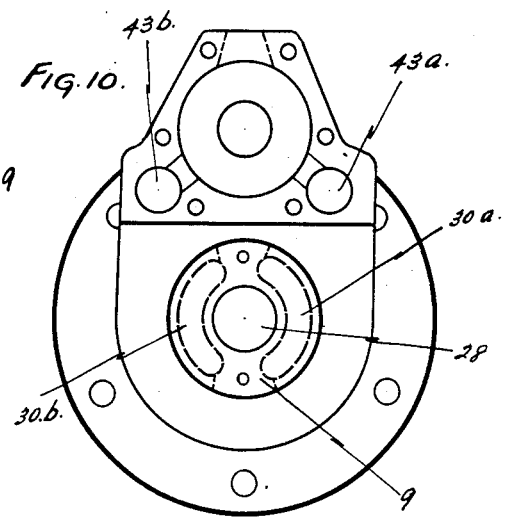
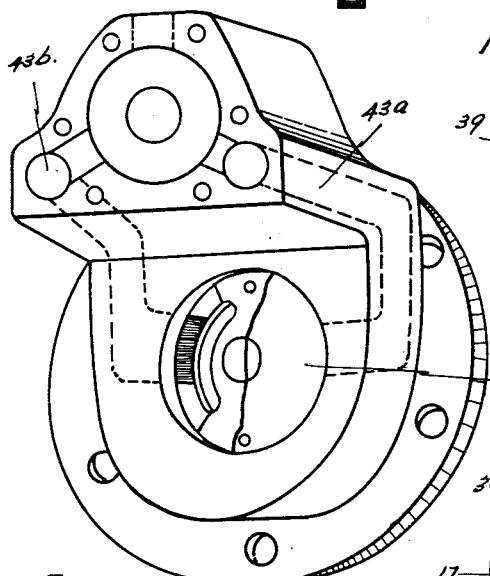
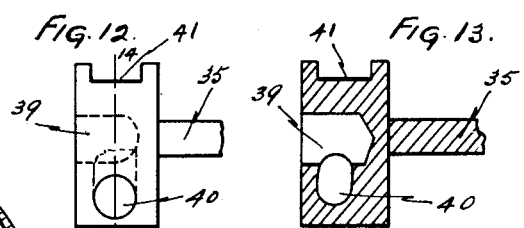
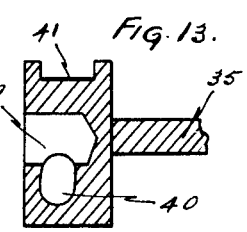
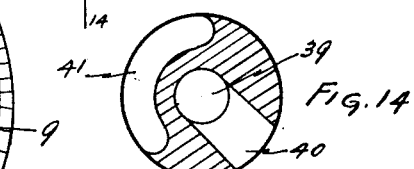
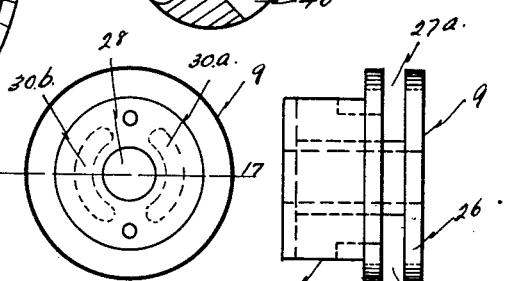
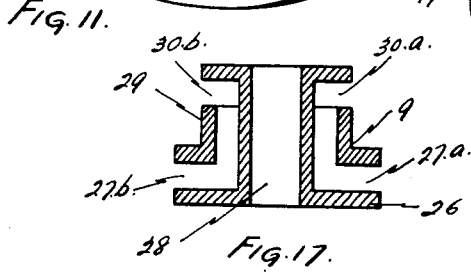
Inventor
Moriel V. Andrews
By Albert E Dieterich
Attorney.

Patented Dec. 12, 1933

1,938,735

UNITED STATES PATENT OFFICE 1,938,735

ROTARY ENGINE

Moriel V. Andrews, Vancouver, British Columbia, Canada

Application October 27, 1931. Serial No. 571,425

2 Claims. (Cl. 121—62)

This invention relates to improvements in prime movers, air compressors, pumps and such like mechanisms where compactness and space saving features are a desideratum.

An object of my invention is to provide a power unit in compact form suitable for driving or driven purposes.

Another object of my invention is to eliminate all exterior moving mechanism and to provide simply a rotating shell housing all the mechanism, thereby attaining the utmost simplicity exteriorly.

A further object of my invention is to provide a power unit suitable for steam or internal combustion and especially applicable to small power units.

By simple modifications of the valve mechanism my invention can be adapted for use as air compressors or pumps and lends itself particularly well for direct connection to power units or may be belt driven.

A still further object of my invention is to provide either a power unit or a driven unit offering the greatest possible factor of safety to the user, as in my design there are no exterior moving parts whatsoever except a revolving unit of the nature of a pulley that offers no obstructions for the entanglement of clothing or such like.

My invention will be more readily understood by reference to the drawings accompanying and forming part of this application, and in which:

Figure 3 is an end view of rotating cylinder body with covers and piston removed.

Figure 4 is an opposite end view to Figure 3 and shows recessed distributing valve seat and cylinder ports in dotted lines leading to said valve seat.

Figure 5 is a cross section of cylinder body taken on line 5—5 of Figure 3.

Figure 6 is an elevation of piston showing elongated side.

Figure 7 is a cross section of Figure 6 and shows piston roller mounted interiorly of piston and ball seat.

Figure 8 is a plan view of piston.

Figure 9 is an elevation of control valve and distribution valve housing dismantled and carrying one end cover upon distribution valve.

Figure 10 is an end view of Figure 9 and shows control valve in upper housing and ports therefrom, also shows end of distribution valve in lower housing and end cover plate to cylinder block.

Figure 11 is a perspective view of Figure 9 illustrating run of ports and has section of distributor valve removed to show connecting ports in valve.

Figure 12 is a side elevation of control valve and shows side outlet from control port of valve, also indicates top of exhaust passage around said valve and shows valve stem for mounting control handle on.

Figure 13 is a vertical section of Figure 12.

Figure 14 is a section taken on the line 14—14 of Figure 12 and shows exhaust passage through valve and central port and leading port therefrom.

Figure 15 is an elevation of distributing valve.

Figure 16 is an end elevation of Figure 15 looked upon from the small end and shows ports in and through body of valve in dotted lines.

Figure 17 is a section of valve taken on line 17—17 of Figure 16 and shows port passages therethrough.

Figure 1:
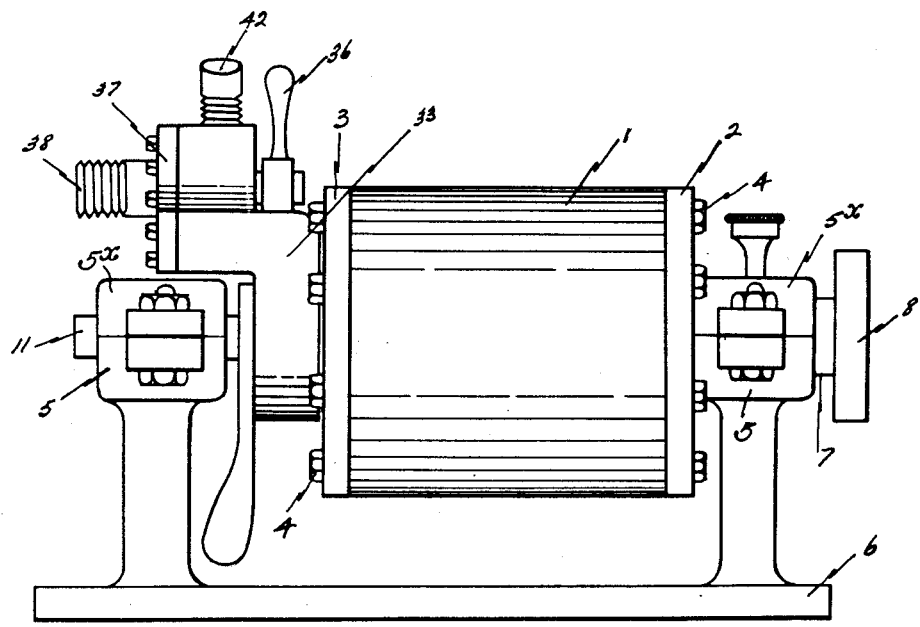
Figure 1 is an elevation of my invention of prime mover as built for steam or air operation.

In these drawings like numerals indicate like parts and 1 indicates a rotating cylinder block in exterior appearance of the nature of a pulley and having the ends 2 and 3 secured thereon by the bolts 4, the whole being mounted in the bearings 5 of the bed-plate 6. The cylinder block end cover 2 has a bearing 7 and a power take-off coupling flange 8 integral therewith (to which flange any suitable power take-off may be coupled), while the opposite end cover 3 is mounted upon the neck of a cylindrical distribution valve 9, the head of which is of enlarged diameter and fits into the recess 10 formed in the end of the cylinder block 1, see cross section of cylinder block in Figure 5.

The valve 9 is carried on the stationary shaft 11, one end of which shaft is secured in the front bearing 5 and is prevented from turning by the pine 12 extending through the shaft and into the lower part of the bearing, and also into the cap 5x thereof. Upon the opposite end of the shaft 11 is secured the motion plate or cam 13 positioned interiorly of the cylinder block 1.

The motion plate or cam 13 is held concentrically within the cylinder block 1 by being mounted on the core 16 of the cylinder block. The interior end of the shaft 11 is supported in the recessed bearing 14a provided in the end cover plate 2 and the shaft passes through the bearing 14 of the core 16.

The cylinder block 1 has the cylinders 15 bored concentrically around the bearing 14 and in the case of the present engine being described there are six of these cylinders. The inner core 16 of the cylinder block 1 left after the cylinders are bored and through which the bearing 14 is provided has its end 17 recessed well back into the block 1 to provide room for the motion plate 13. Below the surface 17 of the core 16 the cylinder walls are slotted at 18 to provide a path for the forwardly extended face or flange 19 of the motion plate 13 around which the cylinder block 1 rotates.

Fitting the cylinders 15 are the pistons 20 provided with the usual piston rings 21 and fitted inside of the pistons and on the usual piston pin are the rollers 22, the face of which contacts the arcuate flange 19 of the motion plate 13.

The pistons 20 have one half, or approximately so, of their sleeve portion extended to give additional bearing surface and to provide a mounting for a ball bearing at 23, which ball bearing contacts the back face 24 of the arcuate flange 19 formed on the motion plate 13, thereby securing the pistons 20 thereon and giving them their reciprocating motion when the cylinder block 1 is caused to revolve around the motion plate 13.

The cylinders 15 have their inner end provided with a port 25, see Figures 3, 4 and 5, which port is extended to connect with the recess 10 in the end of the cylinder block 1 and in which the head of the distribution valve 9 fits. This valve 9 is shown in Figures 15, 16 and 17 and has its head end enlarged at 26 to fit the recess 10 of the cylinder block where it is retained by the cover plate 3. Intermediate the thickness of the head 26 are cut two slots 27a and 27b, one on each side of the concentric bearing 28 through the body of the valve.

The body 29 of the valve is of smaller diameter than the head 26 and has its opposite sides cut away to provide the ports 30a and 30b connecting with the slots 27a and 27b in the head of the valve. The outer end of the body 29 is provided with a cover plate 31 to which is secured the lever 32 by which the valve 9 is positioned to control the direction of rotation of the cylinder block. The valve 9 extends through the end cover 3 of the cylinder block into the steam chest 33 mounted at one end of the cylinder block 1 and the steam chest 33 is virtually mounted upon the valve 9.

The upper part of the steam chest is offset and extends over the front bearing 5 and is fitted with the control valve 34, the stem 35 of which extends through the back of the upper portion of the steam chest 33 and is fitted with the control handle 36. Three views of the steam chest are shown in Figures 9, 10 and 11 and three views of the control valve in Figures 12, 13 and 14.

An inlet ported cover plate 37 is provided to close the end of the control valve housing and the inlet port 38 therethrough registers with the central port 39 of the control valve 34.

A side outlet port 40 is cut into the body of the valve 34 to register with the central port 39, and on the periphery of the valve 34 and opposite the side outlet port 40 is cut the exhaust port 41 registering with the exhaust outlet 42 provided in the top of the steam chest 33. The steam chest 33 is provided with the ported passages 43a and 43b connecting the control valve 34 with the distribution valve 9 which in turn connects with all the cylinders 15.

Balls 44 are provided between the end cover 2 and the rear end of the motion plate 13 to comprise a ball thrust bearing at this point.

A sequence of operations is as follows: Steam is admitted through the inlet port 38 and the control handle 36 set to admit steam through the control valve 34 and through the side port 40 into the ported passage 43a which in turn delivers the steam to the valve 9 and port 30a therein, then into the slotted port 27a for delivery to the ports 25 of the cylinders 15 as they rotate around the valve 9, thus admitting steam under the pistons within the cylinders.

Figure 2:
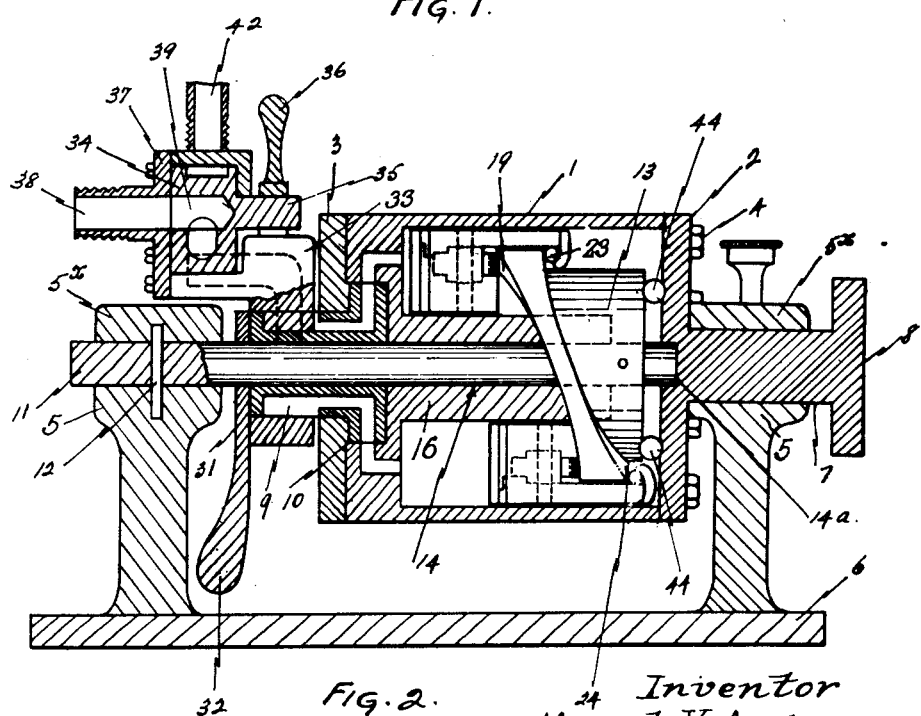
Figure 2 is a sectional elevation of Figure 1 and shows fixed motion plate and cylinders positioned inside of revolving casing.

As will be seen from Figure 2 the piston at the top of the cylinder block is at the commencement of its power stroke while the piston at the bottom of the block is at the commencement of its exhaust stroke, while the other four cylinders in the block would be equally divided on power and exhaust strokes during one revolution of the cylinder block, but each piston would have delivered its quota of power during one revolution before reaching the exhaust position.

While the ported passage 43a in the steam chest is delivering steam to the port 30a and slotted port 27a in the distribution valve 9 the slotted port 27b and port 30b and the ported passage 43b becomes the exhaust passage from the cylinders 15 delivering the exhaust steam through the peripheral exhaust port 41 in the control valve 34 to the exhaust outlet 42 at the top of the steam chest 33.

If the position of the handle 36 of the valve 34 and the control lever 32 of the distribution valve 9 be reversed the direction of rotation of the cylinder block 1 is reversed by reason of the reversal of the steam flow from the ported passage 43a to the passage 43b in the steam chest and through the connecting ports therewith.

Having now fully described my invention, what I claim and desire to be protected in by Letters Patent, is:

1. In a rotary engine of the kind described the combination comprising, a bed plate, a pair of stationary bearings, a steam chest, a rotating cylinder block, said block being in engagement with said steam chest and mounted between said bearings, said block having multiple cylinders, said cylinders being in parallelism with the axis of rotation of said cylinder block, said block being mounted upon a fixed shaft, said shaft having one end projecting through one end of said cylinder block and being carried by one of said stationary bearings while the opposite end of said shaft is carried by a recessed bearing formed upon the inner face of the cylinder block cover plate, said cover plate having an outer bearing and a power take-off coupling flange integral therewith, said outer bearing being carried by the other of said stationary bearings, a cam positioned rigidly upon said fixed shaft and interiorly of said cylinder block, said cam having an arcuate path formed thereon, pistons fitting said cylinders, said pistons having piston pins and rollers, said rollers being mounted upon said piston pins interiorly of said pistons, means engaging said rollers with said arcuate path of said cam whereby when steam is admitted through said steam chest and against said pistons the said rollers are forced against said arcuate path and cause said pistons and said cylinder block to rotate around said fixed shaft.

2. In a rotary engine of the kind described, the combination comprising a bed plate having a pair of stationary bearings thereon, an offset steam chest having a control valve and distribution valve mounted therein, a rotating cylinder block having end cover plates in engagement with said steam chest and mounted between said stationary bearings, said block having multiple cylinders in parallelism with the axis of rotation of said cylinder block, said block being mounted upon a fixed shaft having one end projecting through one end of said cylinder block and said steam chest and said distribution valve, said projecting shaft end being rigidly mounted in one of said stationary bearings while the opposite end of said shaft is supported upon the inner face of one of the cylinder block cover plates, said cover plate having a boss and a power take-off coupling flange, said boss being carried by the other said stationary bearing, a motion cam positioned rigidly upon said fixed shaft and interiorly of said cylinder block, said cam having an arcuate path formed thereon, pistons fitting said cylinders in engagement with the arcuate path of said motion cam whereby when steam is admitted through said steam chest and under said pistons the said pistons are forced against said arcuate path and cause said cylinder block and pistons to rotate around said fixed shaft.

MORIEL V. ANDREWS.